ately be aligned by a mirror-like reflection of the graduations on the scale. Graduations may be provided on a platen-scale, but when so provided are apt to be incorrectly set because of being usually aligned with each other so that they may be used with a printed-line scale.

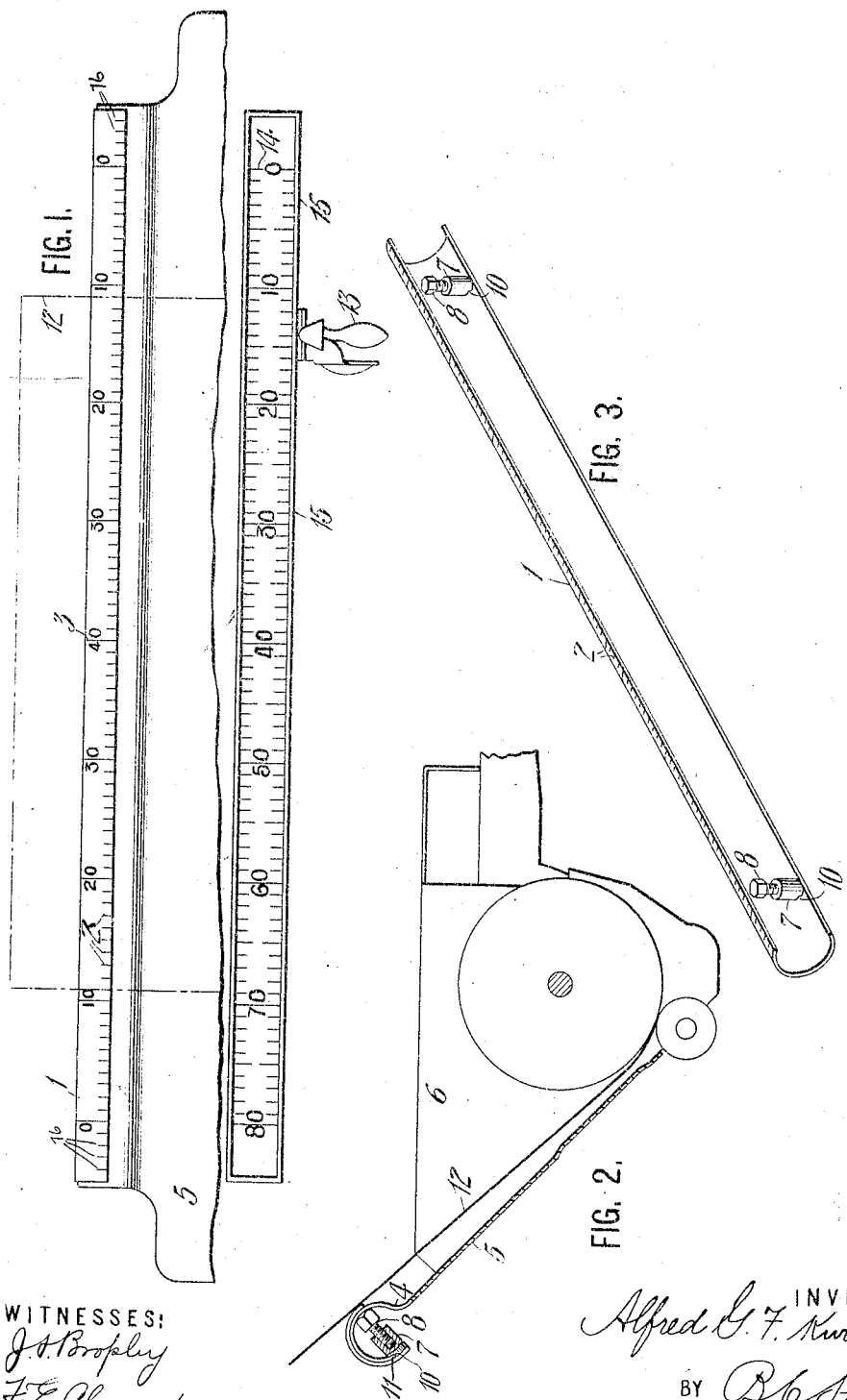

UNITED STATES PATENT OFFICE.

ALFRED G. F. KUROWSKI, OF NEW YORK, N. Y., ASSIGNOR TO UNDERWOOD TYPEWRITER COMPANY, OF NEW YORK, N. Y., A CORPORATION OF DELAWARE.

TYPE-WRITING MACHINE.

1,203,632.  Specification of Letters Patent.  Patented Nov. 7, 1916.

Application filed September 19, 1912. Serial No. 721,122.

*To all whom it may concern:*

Be it known that I, ALFRED G. F. KUROWSKI, a citizen of the United States, residing in Brooklyn borough, in the county of Kings, city and State of New York, have invented certain new and useful Improvements in Type-Writing Machines, of which the following is a specification.

The present invention relates primarily to means for facilitating the positioning of work-pieces at the center of a typewriter carriage. For this purpose a work-piece centering scale is located at the introductory side of the platen, being preferably mounted at the upper rear end of the paper table behind the platen, so that work-pieces may be centered on the paper table by means of the scale before they have been fed forward between the platen and the feed-rolls to the printing position. By placing the scale at the intake side of the platen the work-sheet may be accurately centered before it has been gripped by the feed-rolls, and without the necessity of releasing the feed-rolls and readjusting the work-sheet after it has been placed on the platen.

The scale preferably comprises two series of numbered graduations commencing with zero at or near the ends of the scale and numbered toward the center of the scale, the distance between the zero points being equal to the length of the full line of writing. A work-sheet may therefore be centered on the scale by so positioning the work-sheet that the same scale numbers appear at each edge of the sheet. The scale is also provided with graduations or markings extending beyond the zero point at each end of the scale to enable a work-sheet wider than the full-length line of writing to be centered thereon.

A letter-space scale may be used in conjunction with the paper-centering scale, the graduations of the two scales being in register, that is, the zero point on the letter-space scale being directly in front of or in line with the zero point on the centering scale. A marginal stop controlling the margin on the left of the work-sheet is adjustable along the letter-space scale, which, in conjunction with the paper-centering scale, enables the stop to be set for any desired margin for a work-sheet of any width. In other words, the distance of the margin stop from the scale number in register with the edge of the work-sheet, represents the width of the margin for which the stop is set.

Other features and advantages will hereinafter appear.

In the accompanying drawing, Figure 1 is a view of my new scale, and a work-sheet diagrammatically shown in position over the scale. Fig. 2 is a cross sectional view of Fig. 1. Fig. 3 is a perspective view of the scale detached.

The scale 1, having graduations 2 which are numbered from zero at each end toward the center 3, which is marked "40" in this case, is preferably of a tubular construction, so as to conform with the curvature 4 (Fig. 2) of the bead of the paper table 5 on the typewriter carriage 6. A boss 7 is fastened to the scale 1 near each end thereof and within the same to hold a screw 8. When this screw is turned outwardly, it bears against the inner surface of the bead of the paper table 5. This screw clamp is rendered more effective by having the lugs 7 slightly undercut at 10 to allow the edge 11 of the tubular bead of the paper table 5 to catch beneath the lugs; this affording a firmer grip of the scale 1 on the said paper table.

It will be noted that the lugs and screws are within the bead, preventing the paper or the sleeve of the operator from catching thereon.

The work-sheet 12 is centered by placing it over the scale 1, as shown diagrammatically in Fig. 1, and adjusting it so that the same number of graduations remain uncovered at either side. The work-sheet must be adjusted toward either the right or left, until it registers with like graduations at its side edges.

To facilitate the setting of the marginal stop 13, which governs the margin upon the left of the work sheet 12, the graduations 2 on the right half of the scale 1, are arranged to coincide with the graduations 14 on the typewriter letter-space scale 15.

The typewriter carriage 6 is usually wider than the writing line of the typewriter, to receive paper wide enough to allow a margin on each side of the written matter. The sheet 12 may overlap the zero or starting point of the graduations 2 and 3 on the scales 1 and 15. Auxiliary graduations 16 extend beyond the zero marks on scale 1, so that a sheet may be centered by means of the graduations 16 beyond the zeros at each end.

Variations may be resorted to within the scope of the invention, and portions of the improvements may be used without others.

Having thus described my invention, I claim:—

1. In a typewriting machine, the combination with a paper table having a bead at its upper end, of a scale curved to conform to the shape of said bead, and a clamping device on said scale extensible within the bead to clamp the scale on the bead.

2. As an article of manufacture, a typewriter scale semi-cylindrical in cross section and provided with clamping devices on the interior of the scale.

3. As an article of manufacture, a typewriter scale substantially semi-cylindrical in cross section and comprising blocks fixed to the inner surface of the scale, and clamping members threaded into said blocks.

4. In combination with a paper table having a bead at its top edge, a semi-tubular scale conforming with the curvature of said bead, and means located within the semi-tubular scale to clamp the scale to the bead.

5. In combination with a paper table having a bead at its top edge, a semi-tubular scale conforming with the curvature of said bead, and clamping means located substantially wholly within the bead and scale and concealed therein to fasten said scale on a table.

6. In a typewriting machine, the combination with a revoluble platen and its frame, of a paper shelf at the introductory side of the platen, and a centering scale on said shelf extending from one side to the other thereof in position to be overlaid by a work sheet, said scale having graduations reading toward the center from two zero points and other graduations at the outside of the zero points, one zero point agreeing with the zero point of the usual frame scale.

7. In a typewriting machine, the combination with a revoluble platen and its frame, of a paper shelf at the introductory side of the platen and a centering scale on said shelf extending from one side to the other thereof, in position to be overlaid by a work sheet, said scale having points coincident with the beginning and end of the usual frame scale, and graduations of the same magnitude as the usual frame scale graduations, extending beyond said points on said first mentioned scale, whereby a sheet of paper of any width that can be accommodated by the platen frame, may be centered and the width of the margin determined.

ALFRED G. F. KUROWSKI.

Witnesses:
F. E. Alexander,
Titus H. Irons.